Aug. 3, 1965   J. P. HAMMOND ETAL   3,198,856
METHOD OF FABRICATING A COMPOSITE NUCLEAR FUEL CORE ELEMENT
Filed May 29, 1963

INVENTORS.
Joseph P. Hammond
BY   Thomas D. Watts

ATTORNEY.

3,198,856
METHOD OF FABRICATING A COMPOSITE NUCLEAR FUEL CORE ELEMENT
Joseph P. Hammond, Knoxville, and Thomas D. Watts, Oak Ridge, Tenn., assignors to the United States of America as represented by the United States Atomic Energy Commission
Filed May 29, 1963, Ser. No. 288,072
7 Claims. (Cl. 264—.5)

Our invention relates generally to neutronic reactor fuel core materials and more particularly to a method of fabricating a composite fuel core for plate-type fuel elements by powder metallurgical techniques.

Plate-type fuel elements, also known as the MTR-type fuel elements, and their fabrication methods are well known in the art. This type of fuel element has been used successfully in a number of operating reactors including the Materials Testing Reactor (MTR), which is described in U. S. Patent No. 2,832,732, issued on April 29, 1958, in the name of Eugene P. Wigner for "Neutronic Reactor." The "picture frame" or "sandwich" technique for fabricating these plate-type fuel elements is described in detail in the text, "Nuclear Reactor Fuel Elements Metallurgy and Fabrication," edited by Albert R. Kaufman, Interscience Publishers, John Wiley & Sons, New York, 1962, p. 442, et seq.

A more sophisticated embodiment of the plate-type fuel element for use in a high flux reactor is disclosed in the co-pending application of the common assignee, Serial No. 82,141, filed January 11, 1961, now U.S. Patent No. 3,175,955, in the name of Richard D. Cheverton for "Gradient Fuel Plates," now Patent No. 3,175,955, issued March 30, 1965. That application shows a "flux-trap" reactor utilizing involute, plate-type fuel elements with compound or composite fuel "cores" within a "sandwich-type" cladding. The "core" is the material inside the cladding. A composite core comprises two or more discrete regions: (1) a primary core which comprises an alloy containing fuel material and which varies in thickness across the width of the element, and (2) a secondary core which comprises a metal or alloy, and which may contain either a burnable neutron poison or diluent filler material. For any given fuel element shape and size, by utilizing a composite core, an infinite number of combinations of primary and secondary core shapes and compositions can be fabricated to yield any desired power distribution in the reactor. This is particularly useful in the case where it is desirable to distribute a burnable neutron poison within the fuel plate in a concentration gradient which differs from the fuel concentration.

Heretofore, composite curved fuel cores having a variable thickness across their width have been fabricated by cold pressing a metal powder or metal-ceramic powder for each component of the core separately into metal or cermet pieces of rectangular cross section, followed by hot forging to the desired configurations. The primary core, containing fuel material, is pressed from a metal or metal-ceramic powder mixture, then hot forged into the curved configuration, and the secondary core containing filler material or a neutron poison is pressed separately from a metal powder mixture followed by the hot forging to a complementary configuration which will fit in mating relationship with the primary core to provide a rectangular core shape amenable to roll-cladding techniques. The composite core, which is thicker than the final desired thickness, is placed in a "picture frame" sandwiched between two plates of cladding metal, also thicker than the desired final cladding thickness. This assembly is then reduced in thickness and a metallurgical bond achieved by hot rolling at elevated temperature to form a fuel plate in a condition for final forming and assembly. Relative thickness variations designed into the primary and secondary cores are retained throughout the rolling process.

The fabrication process described above has the disadvantage that the lubricant used in the forging process is often trapped in or adsorbed on the surface of the core pieces and, upon hot rolling, causes blistering of the cladding resulting in an imperfect bond between the core and the cladding and between the respective core components. Further blistering results from the escape of occluded air from pockets between the forged components during the hot rolling process. With respect to separate pressing of the core components, there are also a number of disadvantages, such as undesirable lateral readjustment of powder both during pressing and subsequent rolling resulting in an inability to maintain the required density and fuel or poison gradient throughout the fabrication. In addition, it is difficult to forge two or more separate curved members, such as the separate fuel core components described, without having void spaces in the interface gap due to imperfect fit of the mating surfaces.

Various attempts have been made to reduce the blistering problem, including vacuum degassing of the core at elevated temperature prior to rolling and reduction of rolling temperature to prevent vaporization of entrapped forging lubricants. However, these attempts have only alleviated the blistering problem to a limited extent.

It is therefore, an object of our invention to provide an improved method for the fabrication of a composite core for fuel element plates by powder metallurgical techniques.

Another object of our invention is to provide a method for fabricating a composite core free of imperfection due to occluded gas and entrapped volatile lubricants.

Another object is to provide a method of fabricating a composite core of uniform density with uniform, closely-controlled fuel and/or burnable poison gradient.

Still another object of our invention is to provide a composite core free of occluded gas and entrapped volatile lubricants.

A further object of our invention is to provide a composite core for fabricating fuel element plates free of blisters in the cladding.

A still further object is to provide a higher quality composite core more economically than could be done previously.

These and other objects of our invention will become apparent from the following detailed description and claims, taken in conjunction with the accompanying drawings, in which:

Figure 1:
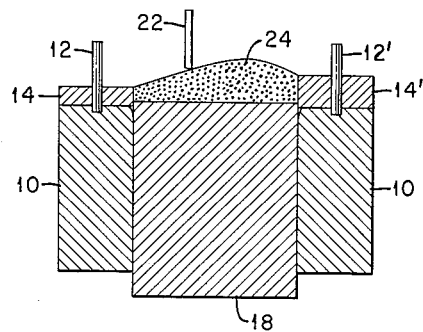
FIG. 1 represents schematically the first step for pressing a composite core and shows a die assembly with a lower member of a die top and a first metal powder containing a nuclear fuel material shaped to a desired contour.
Figure 2:
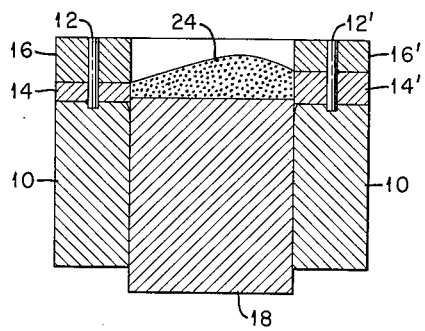
FIG. 2 represents the same die assembly with an upper member of the die top inserted in position to accept a second metal powder.
Figure 3:
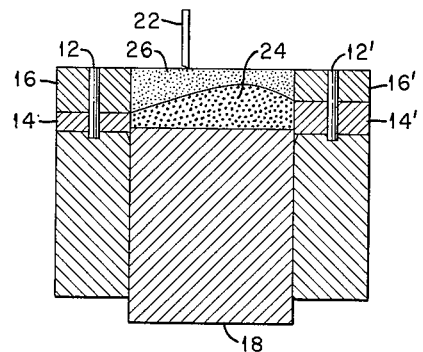
FIG. 3 shows the same assembly as FIG. 2 with a second metal powder filler material placed on top of the first metal powder.

The term "metal powder" as used in the present specification is intended to include not only materials generally classified in the art as metal, but also powders of alloys of metals and combinations of metals and ceramics, referred to a "cermets" in the art.

In accordance with our invention, a composite core of nuclear fuel material and a filler material, which may, if desired, contain a burnable neutron poison, is fabricated by charging a die assembly with a first metal powder containing the nuclear fuel material and shaping the upper surface of said first metal powder charge to a desired contour. A second metal powder containing the filler material is then placed within the die assembly, on top of the first metal powder, to bring the powder level across the entire die up to a selected lever. The two powders are then lowered into a pressing position in the die and simultaneously pressed to form a composite metal compact.

Using the powder metallurgical method of our invention, a composite fuel core which comprises a metal fuel material and metal filler material (with or without a burnable neutron poison) is formed at a single pressing into an integral or single-piece core. Thus, an interface gap between the two sub-portions of the core is eliminated, while at the same time any desired graded loading of fuel and/or neutron poison may be fabricated into the integral core by design of the contour surfaces of the die top described herein. In addition, a more uniform fuel and/or burnable poison gradient is maintained throughout the fabrication process.

Referring now to the drawings in detail, a die assembly employed in the method of the present invention is illustrated schematically in FIGS. 1-4. A suitable die 10, for use in a double-acting press, is provided with guide pins 12, 12' and a central cavity shaped to conform to a desired fuel core shape. A removable die top comprising a lower member 14, 14' which serves as a fuel contour template for the shaping of the fuel material contour and an upper member 16, 16' fitting in mating relationship with lower member 14, 14' which serves as a template for leveling the filler material are held in place on the die by guide pins 12, 12'. A lower punch 18 is slidably inserted in the central cavity of the die 10 to support the powder charges to be pressed and an upper punch 20 (FIG. 4) is slidably inserted into the top of said die 10 for the pressing operation. Straight edge member 22 shapes the upper surface of the powder to the contours defined by the members 14 and 16 of the die top.

Figure 4:
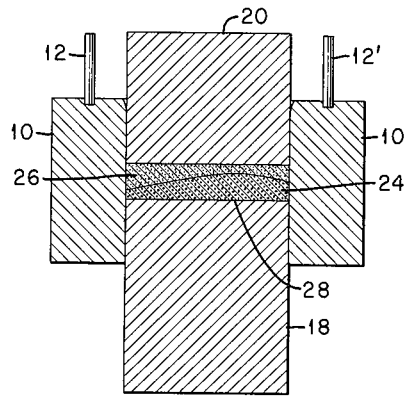
FIG. 4 shows the die assembly with the die top removed in the final step of pressing the two metal powders simultaneously after lowering the powders into the pressing portion of the die.

In the first step (FIG. 1) of our method the lower punch 18 is inserted through the die 10 a desired depth into the lower member 14, 14' of the die top which is attached to the die 10 by means of guide pins 12, 12'. A thoroughly blended metal powder mixture 24 containing a nuclear fuel material is loaded into the lower member 14, 14' of the die top and the upper surface of this powder 24 is shaped using the lower member 14, 14' as a template, to the fuel gradient contour by means of straight edge member 22. The upper member 16, 16' of the die top, in the second step (FIG. 2), is disposed on top of lower member 14, 14' and held in position by guide pins 12, 12' to provide a cavity for the addition of a second metal powder filler material on top of the first metal powder 24. A second metal powder 26 consisting of the filler material, which may also contain a burnable neutron poison, is placed in the cavity of upper member 16, 16' on top of the nuclear fuel mixture 24 and leveled to the surface of the upper member 16, 16' with straight edge member 22, thereby bringing the powder level up to a selected level (see FIG. 3). This filler mixture must be poured carefully into the die, so that the fuel mixture surface contour is maintained undisturbed. With the die top removed the upper punch 20 of the double-acting press is then inserted into the die 10 for the final pressing step (FIG. 4). The powder mixtures 24, 26 are lowered to a pressing position in the die 10 with the upper punch 20 resting on the powder and the powders are then pressed simultaneously at a pressure sufficient to form a form-retaining composite metal compact 28.

The configuration and thickness of the two members of the die top are determined by back calculating from rolled specifications to the leveled powder configuration. In making these calculations, consideration must be given to the compressibility of the fuel and filler portions along with width and length increase relative to thickness decrease with rolling. Material densities in the as-pressed and rolled condition is also considered.

Figure 5:
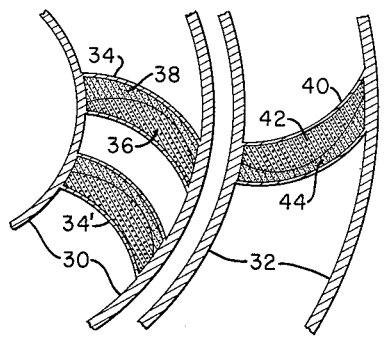
FIG. 5 represents schematically the arrangement of the fuel elements in the reactor fuel region of a high-flux reactor.

The composite metal compact 28, thus formed, is ejected from the die and is ready to be placed in a "picture frame" and roll clad into fuel plates using the conventional technique previously described. The final involute configuration of the plates is achieved by a low-pressure marforming technique known in the art. Involute fuel plates are arranged in the reactor fuel region, as shown schematically in FIG. 5. Referring now to FIG. 5, a cross section of a partial reactor fuel region is shown comprising inner fuel annulus walls 30 and outer fuel annulus walls 32 with fuel plates disposed between the walls of each annulus. In this preferred embodiment, the inner fuel plates 34, 34' consist of an aluminum clad fuel core, which core is fabricated from a composite metal compact comprising a fuel mixture 36 consisting of $U_3O_8$ in aluminum diluent and a filler material 38 with neutron poison consisting of $B_4C$ and a cadmium-containing material in aluminum diluent. In the outer fuel plate 40 the fuel mixture 42 also consists of $U_3O_8$ and aluminum diluent while the filler material 44 consists of aluminum without a neutron poison. A complete description of this type of fuel core and a high-flux reactor utilizing same is disclosed in the above-mentioned Cheverton application and in numerous technical publications.

The following examples will further illustrate the method of the present invention.

*Example I*

A fuel blend of 26 weight percent $U_3O_8$ powder (−170+325 mesh, U.S. sieve series) in aluminum powder (−100 mesh) was charged in the rectangular bore of the lower member of the die top comprising part of the die assembly of a double-acting press as previously described. The powder was shaped with a straight edge to conform to the fuel contour with the lower member of the die top serving as a fuel contour template. The upper member of the die top was placed in position and a charge of aluminum powder filler material (−100 mesh) was carefully introduced on top of the fuel blend. The filler charged was leveled and the upper punch inserted into the die assembly. The two powder blends were lowered into the pressing position in the die and cold pressed simultaneously at 33 tons per square inch to form a form-retaining metal compact.

Metallographic examination of this metal compact indicated in the fuel portion a continuous aluminum phase with a discontinuous $U_3O_8$ phase and in the filler portion a continuous aluminum phase with no trace of $U_3O_8$. The desired fuel gradient was achieved.

*Example II*

The same fuel blend and procedure as in Example I were used, except that the aluminum powder filler material was blended with 0.13 weight percent $B_4C$ and 1.0 weight percent cadmium neutron poison as a cadmium oxide-containing crown glass. Metallographic examination of the metal compact showed in the fuel portion a continuous aluminum phase with a discontinuous $U_3O_8$ phase and in the filler portion a continuous aluminum phase with a discontinuous phase consisting of inclusions of $B_4C$ and cadmium oxide-containing glass. Thus, while no interface gap exists between the fuel portion and the burnable poison of the compact, metallographic examination and chemical analyses indicated the desired fuel gradient and neutron poison gradient had been achieved in the two portions of the composite compact. Visual and nondestructive testing of fuel plates fabricated from this compact revealed that blisters on the surface of the plates had been essentially eliminated and that dimensional control of the contour and fuel gradient was very good. Analysis of the transverse profile along the length of these fuel plates to ascertain variations in contour indicated that variations between the intended and the average contour obtained were well within the specifications for high flux-type reactors and that maximum deviations occur at the core edges.

*Example III*

A fuel blend comprising 25 weight percent $UO_2$ blended in stainless steel powder (—100 mesh) matrix and a filler material consisting of stainless steel powder were formed into a composite compact by the same method described in Example I. Metallographic examination indicated that the desired fuel contour was maintained during pressing.

The above examples are merely illustrative and are not to be construed as limiting in any way the scope of our invention. It is to be understood that variations in apparatus and procedure may be employed by one skilled in the art without departing from the scope of our invention and that our invention is limited only as indicated by the appended claims.

What is claimed is:

1. The method of fabricating a composite core of nuclear fuel material and a filler material which comprises:
   (a) charging a die across its width with a first metal powder containing said nuclear fuel material;
   (b) shaping the upper surface of said first metal powder charge by scraping the top portion to a desired contour, said contour being selected to provide a variation in powder depth across the width of said die;
   (c) placing a second metal powder filler material, within said die, on the top of said first metal powder, to bring the powder level up to a selected level;
   (d) and simultaneously pressing said first and second metal powders to form a form-retaining composite metal compact.

2. The method of fabricating a composite core of nuclear fuel material and filler material which comprises:
   (a) charging a die across its width with a first metal powder, said first metal powder containing a mixture of a nuclear fuel material and a filler material selected from the group consisting of aluminum and stainless steel;
   (b) shaping the upper surface of said first metal powder charge by scraping the top portion to a desired contour, said contour being selected to provide a variation in powder depth across the width of said die;
   (c) placing a second metal powder filler material within said die, on the top of said first metal powder, to bring the powder level up to a selected level, said second metal powder filler material selected from the group consisting of aluminum and stainless steel;
   (d) and simultaneously pressing said first and second metal powders to form a form-retaining composite metal compact.

3. The method of claim 2 wherein said nuclear fuel material is at least one uranium compound selected from the group consisting of uranium oxide, uranium carbide, uranium nitride and uranium hydride.

4. The method of fabricating a composite core of nuclear fuel material and burnable neutron poison which comprises:
   (a) charging a die across its width with a first metal powder containing said nuclear fuel material;
   (b) shaping the upper surface of said first metal powder charge by scraping the top portion to a desired contour, said contour being selected to provide a variation in powder depth across the width of said die;
   (c) placing a second metal powder containing said burnable neutron poison, with said die, on the top of said first metal powder, to bring the powder level up to a selected level;
   (d) and simultaneously pressing said first and second metal powders to form a form-retaining composite metal compact.

5. The method of fabricating a composite core of nuclear fuel material and burnable neutron poison which comprises:
   (a) charging a die across its width with a first metal powder containing said nuclear fuel material;
   (b) shaping the upper surface of said first metal powder charge by moving a straight edge over the top portion to form a desired contour, said contour being selected to provide a variation in powder depth across the width of said die;
   (c) placing a second metal powder within said die, on top of said first metal powder, to bring the powder level up to a selected level, said second metal powder containing at least one burnable neutron poison selected from the group consisting of boron and cadmium;
   (d) and simultaneously pressing said first and second metal powders to form a form-retaining composite metal compact.

6. The method of fabricating a composite core of nuclear fuel material and burnable neutron poison which comprises:
   (a) charging a die across its width with a first metal powder containing a mixture of a nuclear fuel material and a filler material selected from the group consisting of aluminum and stainless steel;
   (b) shaping the upper surface of said first metal powder charge by moving a straight edge over the top portion to form a desired contour, said contour being selected to provide a variation in powder depth across the width of said die;
   (c) placing a second metal powder mixture within said die, on top of said first metal powder, to bring the powder level up to a selected level, said second metal powder mixture containing at least one burnable neutron poison selected from the group consisting of boron and cadmium, and containing said filler material selected from the group consisting of aluminum and stainless steel;
   (d) and simultaneously pressing said first and second metal powders to form a form-retaining composite metal compact.

7. The method of claim 6 wherein said nuclear fuel material is at least one uranium compound selected from the group consisting of uranium oxide, uranium carbide, uranium nitride and uranium hydride.

References Cited by the Examiner

UNITED STATES PATENTS

| | | | |
|---|---|---|---|
| 1,599,084 | 9/26 | Gibson | 264—113 |
| 1,803,814 | 5/31 | Spengler et al. | 264—113 |
| 2,208,054 | 7/40 | Reed | 25—103 |
| 2,350,971 | 6/44 | Pecker et al. | 264—113 |
| 3,042,598 | 7/62 | Crowther | 176—68 |
| 3,098,261 | 7/63 | Littley | 18—16.5 |
| 3,145,149 | 8/64 | Imhoff | 176—68 |

CARL D. QUARFORTH, *Primary Examiner.*

L. DWAYNE RUTLEDGE, *Examiner.*